Figure 1:
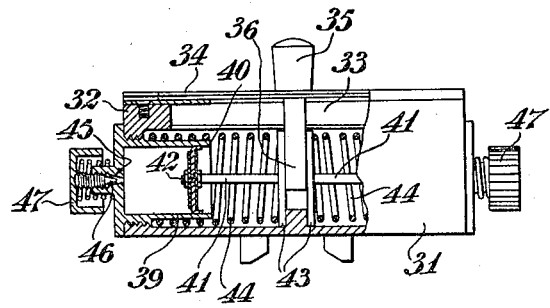

Sept. 6, 1927. 1,641,720
H. A. WIDMER
DIRECTION INDICATING AND WARNING DEVICE FOR MOTOR ROAD VEHICLES
Filed Feb. 4, 1927

INVENTOR
H. A. WIDMER
By D. F. Walkinshaw Atty.

Patented Sept. 6, 1927.

1,641,720

UNITED STATES PATENT OFFICE.

HENRY ALBERT WIDMER, OF LONDON, ENGLAND.

DIRECTION-INDICATING AND WARNING DEVICE FOR MOTOR ROAD VEHICLES.

Application filed February 4, 1927, Serial No. 165,919, and in Great Britain December 21, 1925.

This invention relates to direction-indicating and warning devices as fitted to a rear part and sometimes to a front part of a road vehicle to indicate to the drivers of other evhicles, to police officers and pedestrians, the intentions of the driver.

The kind of warning device to which this invention relates is that having direction indicating faces with electric illuminating means and separately controlled illumination for each face and the present invention is characterized in that the circuits of the electric illuminating means are controlled by switch means which incorporates a delay-action so that the light remains on for a predetermined period of time after manipulation of the switch and is then automatically extinguished thereby.

Conveniently the invention may be applied to a warning device of the known type comprising a box-like casing partitioned to form a number of separate compartments each containing an illuminant and having its front face apertured to form a plurality of direction-indicating faces, there being one compartment corresponding to, and located behind each direction-indicating face.

Various constructional features of the invention will become apparent from the following description and the appended claims.

The invention will be the more readily understood by reference to the accompanying drawings which illustrate practical apparatus for carying out said invention. In the drawings:—

Figure 2:
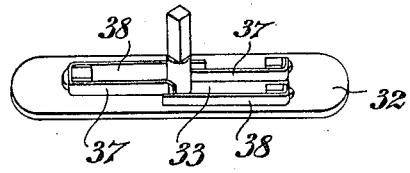
Figure 3:
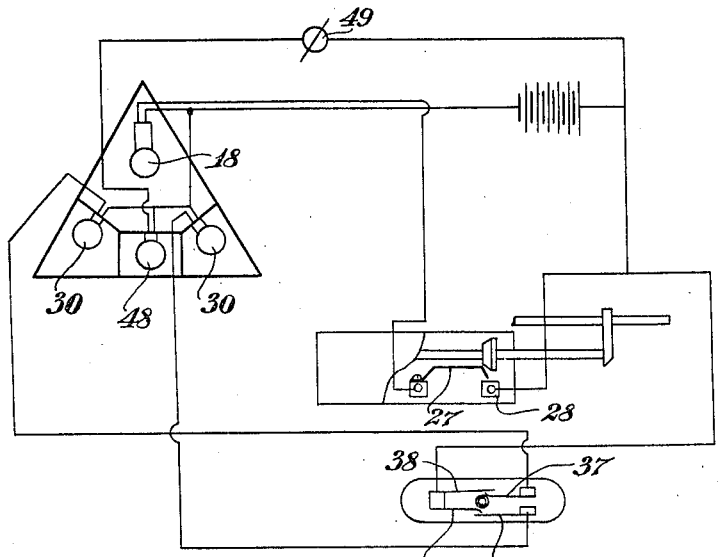

Figure 1 is a longitudinal sectional view of the delay-action switch which controls the direction-indicating signs, Figure 2 is an underneath view of the top of said delay-action switch, and Figure 3 is a diagrammatic view of the several parts employed showing how they are electrically connected together.

According to the embodiment of the invention shown in the accompanying drawings, the casing containing the signalling lamps is designated generally as 1 in Figure 3, and may be, as shown, of triangular shape or form provided with a plurality of compartments, each having illuminating means therein. In Figure 3, 19 designates a lamp adapted to be operated by a foot control circuit closer including the contacts 27 and 28, the same being operated by one of the brake pedals or its equivalent of the automobile when it is desired to signal "stop". This feature of the invention, however, is subsidiary to the main direction indicating switch shown in detail in Figures 1 and 2 and also diagrammatically shown in Figure 3. The "left" and "right" turn indicating lamps are both designated 30, and are included in circuit with the contacts of the direction indicating switch as shown.

Figures 1 and 2 illustrate the preferred delay-action switch mechanism for controlling the lamps 30 in the arrow compartments of the indicator, so constructed as to cause the light to remain on for a short period of time after the operator's hand has been removed from the switch. The said switch mechanism comprises an elongated outer casing 31 having a top 32 in which there is a longitudinal slot 33, the said top 32 carrying on its upper side a sliding handle 34 which has a hand knob 35 and a buffer 36 which traverses the slot 33 and extends down into the outer casing 31. On the underside of the top 32 there are two circuit make-and-break members, one corresponding to each arrow compartment, and each comprising a movable springy contact plate 37 and a fixed co-operating contact 38. The movable springy contact members 37 are so bent and shaped as to lie partly in the plane of movement of the buffer 36 on the underside of the handle 34, so that when said handle is moved in either one direction or the other, the buffer 36 will cause one or other of the moving contacts to move out of the plane of said buffer 36 and to contact with the co-operating fixed contact 38, thus completing the electric circuit. Within the casing 31 there are located at opposite ends thereof, and opposed to one another, a pair of air or fluid chambers each constructed after the fashion of a pump, and each comprising a cylinder 39 with an open or partly-open inner end 40, a plunger 41 reciprocally mounted with the cylinder 39 and having a cup-leather head 42 which is a close fit within said cylinder, a plate 43 fixed to the end of the plunger 41, and a compression spring 44 bearing at one end on the plate 43 and at its other end on the end of the cylinder 39, said spring tending to force the plunger outwardly. When the handle 34 is moved from its normal central position, the buffer 36 thereon contacts with one or other of the plunger plates 43 and presses the corresponding plunger in an inward direction, loading the spring 44. Soon after commencement of the movement of the plunger, the corresponding one of the contacts 37 is pressed against its co-operating contact 38 by the buffer 36 in the manner aforesaid, and remains in contact therewith during further inward travel of the plunger and during the major part of the return movement of the said plunger. The latter returns under influence of the spring 44 and the plate 43 on the plunger presses against the buffer 36 and carries the handle 34 back to its normal position near which position the co-operating contacts 37 and 38 separate. The plunger may be pressed in rapidly to switch on the light, but returns slowly owing to the cup-leather washer 42 effecting a tight joint with the cylinder walls due to the suction effect produced in the cylinder 39. A small air orifice 45 is provided at the end of the cylinder for air to enter the latter which may be adjusted as to size so as to enable the return speed of the plunger to be regulated, by means of a tapered needle portion 46 of a thumb screw 47, which projects into said orifice 45.

Figure 3 illustrates the mode of wiring the complete apparatus, the various component parts of which are shown diagrammatically. The rear lamp 48 forms part of a separate circuit controlled by an ordinary switch 49.

It is to be understood that various modifications may be made in the apparatus illustrated without departing from the scope of the invention; for instance, instead of using only one delay-action switch for controlling both arrow signs, which combines two fluid chambers, two separate switches could be used one for each circuit, each having one fluid chamber.

I claim:—

1. In a direction indicating device for automobiles and the like, a manually operated switch adapted to close the circuit to "right" and "left" turn signal members comprising a casing, cylinder members fitted in the ends of said casing and having throttled air ports, springs within the casing and having their lower ends surrounding said cylinders, plungers each having a portion operating within said cylinders and a plate engaged by said spring, a cover for the casing having a slot, terminal contacts carried by the cover and arranged on opposite sides of the slot, and a contact operating handle slidable in the slot and arranged between the said plates of the plunger devices.

2. In a direction indicating device for automobiles and the like, a direction indicating switch comprising a casing having a slot, a handle slidable in the slot, normally open contacts arranged on opposite sides of the slot and adapted to be closed when the handle is moved, and a pair of spring press plunger devices arranged within the device and working in opposition to each other, said devices including a cylinder and a cup-leather plunger operating therein, said cylinder having a valved air-port for permitting a slow return of the plunger to its normal position.

3. A direction indicating appliance for automobiles and the like comprising switch means including spring contacts mounted in a fixed position for closing each direction circuit, and means for operating said contacts comprising a handle adapted to be manually moved to one side or the other of a neutral position in a rectilinear path with a quick movement and to be returned to its normal neutral position by a slow movement, and means for effecting said movements of the handle comprising a pair of fluid cylinders having an orifice for the passage of fluid, and spring loaded plungers operating in the cylinders.

4. In a direction indicating appliance for automobiles and the like, a direction indicating switch comprising an elongated casing, a cover for the casing having a slot, a pair of circuit closing contacts arranged at each side of the slot on the under side of the cover, a member having a handle slidable in the slot from the middle toward either end thereof, and a pair of spring-pressed plunger devices arranged in the casing beneath the cover, said devices including fluid cylinders for receiving a portion of the spring-pressed plungers to provide a slow return movement therefor.

In testimony whereof I have affixed my signature hereto this 20th day of January 1927.

HENRY ALBERT WIDMER.